(12) United States Patent
Meid

(10) Patent No.: US 10,546,706 B2
(45) Date of Patent: Jan. 28, 2020

(54) REDUCED-COMPONENT HIGH-SPEED DISCONNECTION OF AN ELECTRONICALLY CONTROLLED CONTACTOR

(71) Applicant: Eaton Electrical IP GmbH & Co. KG, Schoenefeld (DE)

(72) Inventor: Wolfgang Meid, Muelheim-Kaerlich (DE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 218 days.

(21) Appl. No.: 15/557,149

(22) PCT Filed: Feb. 18, 2016

(86) PCT No.: PCT/EP2016/053406

§ 371 (c)(1),
(2) Date: Sep. 11, 2017

(87) PCT Pub. No.: WO2016/146333

PCT Pub. Date: Sep. 22, 2016

(65) Prior Publication Data

US 2018/0047536 A1     Feb. 15, 2018

(30) Foreign Application Priority Data

Mar. 13, 2015   (DE) .......................... 10 2015 103 701

(51) Int. Cl.
*H01H 47/22*     (2006.01)
*H02H 9/04*     (2006.01)

(52) U.S. Cl.
CPC .......... *H01H 47/223* (2013.01); *H02H 9/045* (2013.01)

(58) Field of Classification Search
CPC ...... H01H 47/223; H01H 47/32; H02H 9/045; H01F 7/1844
(Continued)

(56) References Cited

U.S. PATENT DOCUMENTS

| 2005/0254270 | A1* | 11/2005 | Melchert | ................ H01H 47/32 363/37 |
| 2013/0009464 | A1* | 1/2013 | Firehammer | ....... H01M 10/425 307/9.1 |

FOREIGN PATENT DOCUMENTS

| DE | 3102656 A1 | 8/1982 |
| DE | 3232217 A1 | 3/1984 |

(Continued)

OTHER PUBLICATIONS

Machine translation of Butzmann et al. German Patent Document DE 102010041018 A1 Mar. 22, 2012 (Year: 2012).*

*Primary Examiner* — Kevin J Comber
(74) *Attorney, Agent, or Firm* — Leydig, Voit & Mayer, Ltd.

(57) ABSTRACT

A contactor includes a coil through which current flows in an active state of the contactor; a controller configured to control the contactor; and a voltage converter, wherein, in the active state, the voltage converter is configured to converts an input voltage into a coil voltage which drops across the coil. The voltage converter can be electrically switched back into the active state from an inactive state using the controller. The contactor is configured to be switched into the active state from the inactive state by activating the voltage converter. The contactor is switched out of the active state into the inactive state by deactivating the voltage converter.

14 Claims, 5 Drawing Sheets

(58) Field of Classification Search
USPC .......................................................... 361/190
See application file for complete search history.

(56) References Cited

FOREIGN PATENT DOCUMENTS

| | | |
|---|---|---|
| DE | 3908055 C1 | 9/1990 |
| DE | 4344126 A1 | 7/1995 |
| DE | 102010041018 A1 | 3/2012 |
| DE | 102012218983 A1 | 4/2014 |
| DE | 102012218988 A1 | 4/2014 |
| WO | WO 2011119669 A2 | 9/2011 |

* cited by examiner

REDUCED-COMPONENT HIGH-SPEED DISCONNECTION OF AN ELECTRONICALLY CONTROLLED CONTACTOR

CROSS-REFERENCE TO RELATED APPLICATIONS

This application is a U.S. national stage application under 35 U.S.C. § 371 of International Application No. PCT/EP2016/053406, filed on Feb. 18, 2016, and claims benefit to German Patent Application No. DE 10 2015 103 701.7, filed on Mar. 13, 2015. The International Application was published in German on Sep. 22, 2016, as WO 2016/146333 A2 under PCT Article 21(2).

FIELD

The present invention relates to a contactor comprising a coil through which current flows in an active state of the contactor. The present invention also relates to a method for the high-speed disconnection of the contactor.

BACKGROUND

Contactors are used to switch electrical loads, for example motors, lighting systems, production facilities or similar, preferably when large electrical loads have to be switched. They often comprise an electromagnetically acting switching apparatus (coil) and/or a semiconductor switch.

DE 43 44 126 A1 discloses electronic high-speed disconnection of such a contactor. The contactor comprises a disconnectable freewheeling circuit and a voltage suppressor diode.

SUMMARY

An aspect of the invention provides a contactor, comprising a coil through which current flows in an active state of the contactor; a controller configured to control the contactor and a voltage converter, wherein, in the active state, the voltage converter is configured to convert an input voltage into a coil voltage which drops across the coil, wherein the voltage converter can be electrically switched back into an active state from an inactive state using the controller, wherein the contactor is configured to be switched into the active state from the inactive state by activating the voltage converter, and wherein the contactor is switched out of the active state into the inactive state by deactivating the voltage converter.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DISCLOSURE

Figure 1:
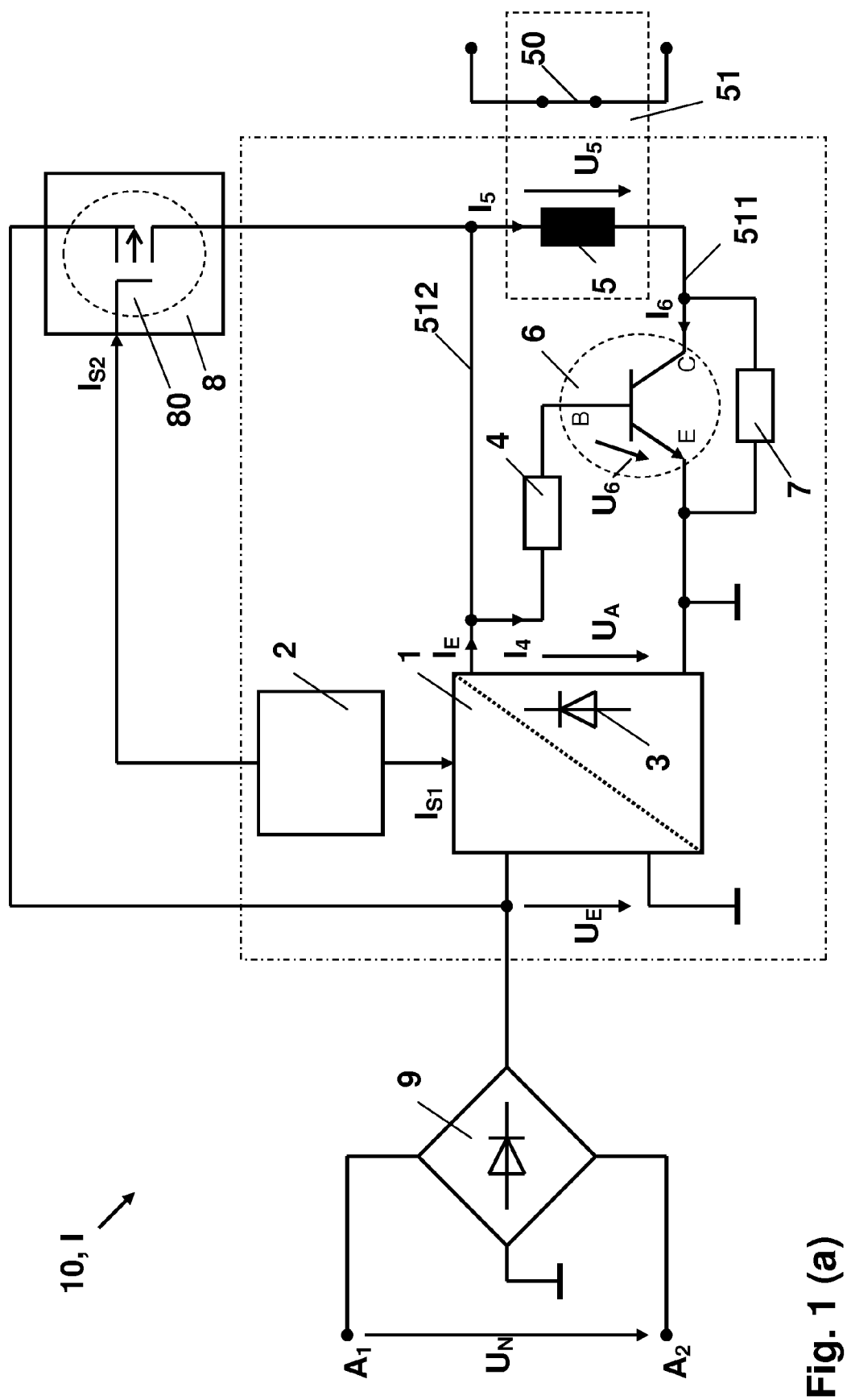
FIG. 1a an embodiment of a contactor according to the invention in the active state.
FIG. 1b an embodiment of a contactor according to the invention in the inactive state.
FIG. 1c a further embodiment of a contactor according to the invention.
Figure 1:
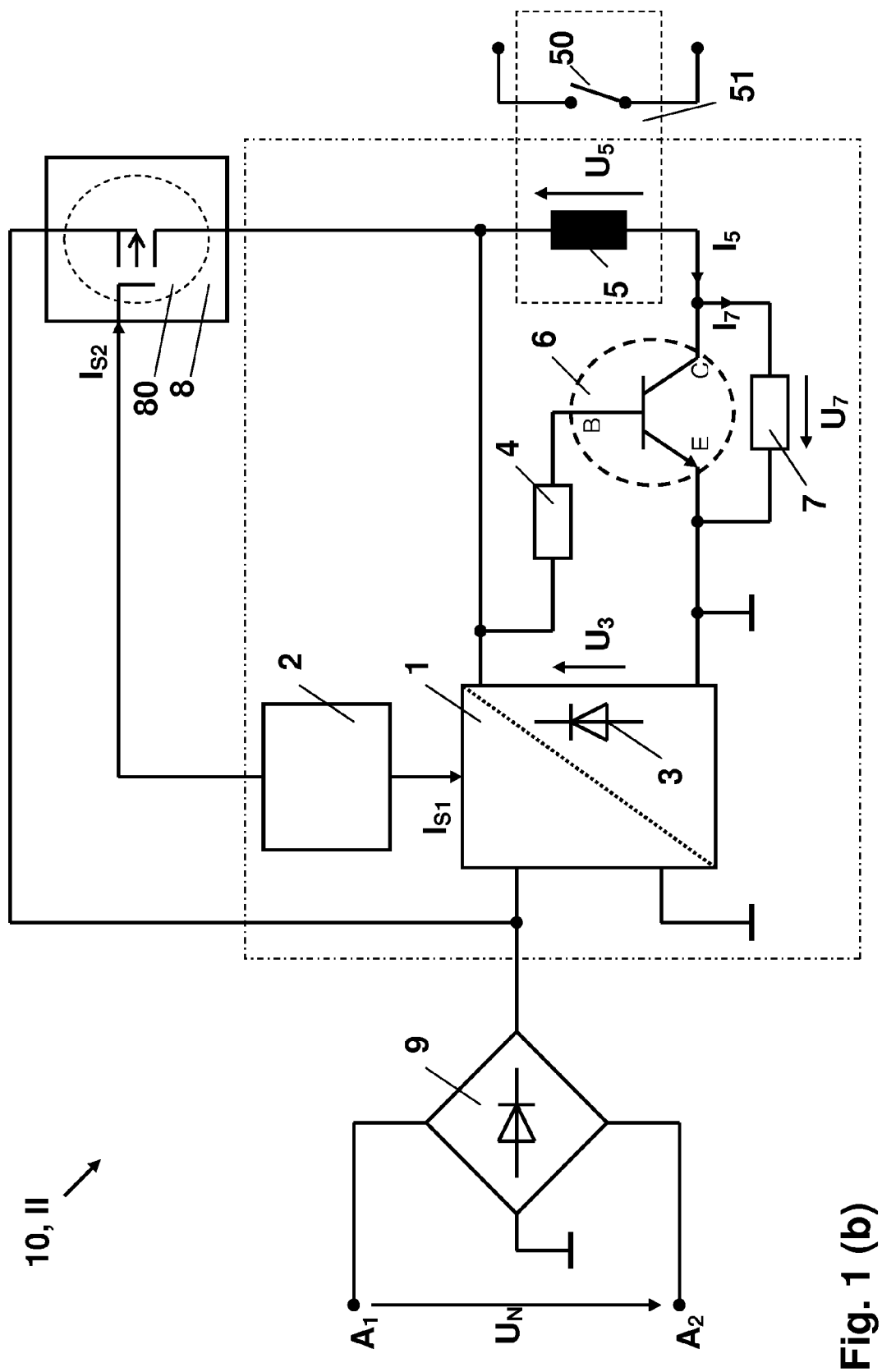
Figure 1:
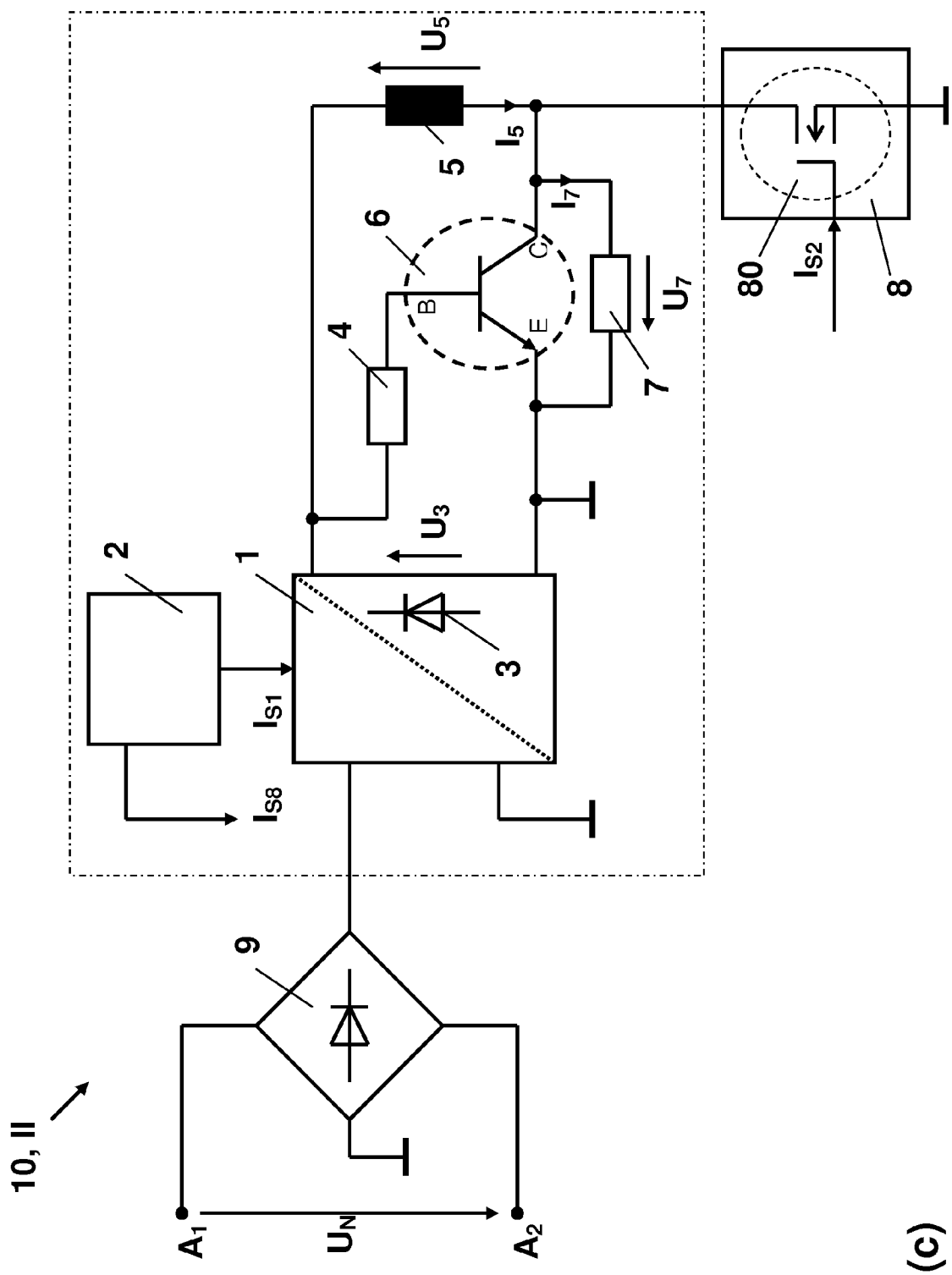

An aspect of the present invention provides a contactor in which the function of the high-speed disconnection is simplified and the number of components required is reduced compared with the stated background art, and therefore the contactor can also be produced cost-effectively, and takes up a very small amount of space, in particular on a printed circuit board.

A contactor or relay is provided for this purpose. A contactor according to an aspect of the invention comprises:

a) a coil through which current flows in an active state of the contactor, b) a control unit for controlling the contactor, and c) a voltage converter, in particular a power supply unit.

The contactor, in embodiments, is characterized in that, in the active state, the voltage converter converts an input voltage into a coil voltage which drops across the coil in the active state, which converter can be electrically switched back into the active state from an inactive state by means of the control unit.

As a result, the coil voltage which drops across the coil can be directly connected and disconnected again by means of the control unit.

In this case, it is particularly preferable for the contactor to be switched into the active state from the inactive state by activating the voltage converter, and to be switched out of the active state into the inactive state by deactivating the voltage converter.

The voltage converter which is required in any case and the control unit which is required in any case for controlling same is thus used in order to activate/connect and deactivate/disconnect the contactor. For this reason alone, the number of components, and the costs and space required for the contactor are low.

The contactor preferably comprises a switching apparatus. The switching apparatus preferably comprises the coil and a contactor contact. In the active state of the contactor, the contactor contact is preferably operated by the coil. The contact is then switched on. In the inactive state of the contactor, said contact is preferably switched off. The contactor contact is thus electromagnetically actuated by means of the coil.

Activating the contactor contact is hereinafter referred to as operating the coil. Deactivating the contactor contact is hereinafter referred to as releasing the coil. It is preferable for the contactor contact to be deactivated in a period of less than 50 ms, particularly preferably in approximately 20 ms.

For this purpose, the control unit preferably comprises a central control means, such as a microcontroller or a microprocessor. The control means is responsible for controlling an operation process and a holding process in the active state of the contactor, and for a disconnection process from the active into the inactive state of the contactor. The disconnection process is also referred to here as high-speed disconnection. This process is controlled by means of the control unit via the voltage converter.

In order to control the operation process, the contactor preferably comprises a current controller, in particular a linear controller or a switching controller, which controls a current intensity of a coil current flowing through the coil. In this case, it is preferable for the control unit to control the current controller. Particularly preferably, the control unit controls the current controller such that the coil current flowing through the coil immediately following activation of the contactor from the inactive into the active state is greater than a holding current, which flows when the coil is operated and the contactor is in the holding process. The larger coil current is necessary for operating the coil and is hereinafter referred to as the must-operate current. In order to hold the coil, the required current intensity of the coil current is lower. The coil current flowing during holding of the coil is hereinafter referred to as the holding current. The holding current is generated by means of the voltage converter.

In a preferred embodiment of the contactor, it also comprises a voltage-limiting component. The voltage-limiting component is preferably short-circuited in the active state. As a result, in the active state, the coil voltage which drops on the output side of the voltage converter drops across the coil. Preferably, the voltage-limiting component is used for the high-speed disconnection of the contactor. For this purpose, it is preferable for a load voltage to drop across the voltage-limiting component immediately following deactivation of said component from the active state into the inactive state.

In order to short-circuit the voltage-limiting component, it is preferable for the contactor to comprise an electrical switch which is conductive in the active state, and open in the inactive state. In a preferred embodiment, the electrical switch is a transistor, for example a bipolar transistor, a field-effect transistor or an IGBT (insulated gate bipolar transistor).

The voltage-limiting component is preferably an electrical resistor, a varistor or a diode. A Zener diode or a suppressor diode is preferred as the diode.

Particularly preferably, the voltage converter comprises a diode that is used as a freewheeling diode for the coil after the contactor switches back into the inactive state from the active state. By using the diode of the voltage converter, there is no need for an additional diode used as a freewheeling diode, and therefore the number of components is reduced further. The diode is also used as a freewheeling diode during the operation process, in particular in a current controller designed as a switching controller.

In this case, it is preferable for the voltage-limiting component and the diode to be arranged in series with the coil after the contactor switches back into the inactive state from the active state. As a result, the energy stored in the coil flows across the voltage-limiting component and the diode after the contactor switches back into the inactive state from the active state.

The voltage converter is preferably a DC voltage converter (DC/DC converter, DC voltage power supply unit), particularly preferably a DC voltage power supply unit. When using a rectifier, which is positioned upstream of the DC voltage converter, the contactor can, however, also be connected to an AC voltage (AC/DC converter, AC voltage power supply unit).

An aspect of the invention provides a method for the high-speed disconnection of a contactor, in particular a contactor in which, sequentially,
  a control unit deactivates a voltage converter, and therefore a coil current flowing through a coil is interrupted,
  an electrical switch opens, and
  a coil voltage which drops across the coil is discharged across a voltage-limiting component and across a diode of the voltage converter.

When the coil current which drops across the coil is discharged, the energy stored in the coil is dissipated.

Disconnecting/deactivating the contactor therefore only requires disconnecting the voltage converter. Nevertheless, the method ensures the required very speedy disconnection of the contactor by utilizing the voltage-limiting component and the diode of the voltage converter. Preferably, a contactor contact of the contactor is deactivated in less than 50 ms, following deactivation of the voltage converter.

The control unit which is required in any case for the contactor and the voltage converter which is required in any case are used in the process. For this purpose, the contactor comprises three components, namely a resistor which is positioned upstream of the electronic switch, the electronic switch for short-circuiting the voltage-limiting component, and the voltage-limiting component. The number of components required for the (high-speed) disconnection of the contactor is therefore very small overall. As a result, the costs for producing the contactor are low, and the amount of space required for the contactor, in particular on a printed circuit board, is small.

The contactor 10 is for example used for connecting and disconnecting preferably large electrical loads. For this purpose, the contactor comprises an electromagnetically acting switching apparatus 51 comprising a coil 5. In an active state I of the contactor 10, a contactor contact 50 is electromagnetically actuated by means of the coil 5. In this case, the switching apparatus 50 can be designed both as a break contact and a make contact. For example, FIGS. 1 (*a*) and (*b*) show a switching apparatus 51 designed as a make contact.

Activating the contactor contact 50, whereby the contact either opens or closes, is referred to here as operating the coil 5. Deactivating the contactor contact 50, whereby the contact is switched back, is referred to here as releasing the coil 5. The contactor contact 50 is deactivated following the change-over of the contactor 10 from the active state I into an inactive state II. In the process, the contactor contact 50 is deactivated in less than 50 ms.

The contactor 10 comprises a control unit 2 for controlling the contactor 10. It also comprises the coil 5. Current flows through said coil in the active state I.

The contactor 10 further comprises a voltage converter 1, which is connected in parallel with the coil 5 in the active state I. In the active state I, the voltage converter 1 converts an input voltage UE into a coil voltage U5 which drops across the coil 5. In the inactive state II of the contactor 10, however, a diode 3 of the voltage converter 1 is used as a freewheeling diode, and therefore the energy stored in the coil 5 can be discharged across the diode 3 of the voltage converter 1.

For this purpose, the contactor 10 also comprises a voltage-limiting component 7, such as an electrical resistor, a varistor or a diode. In the inactive state II, the voltage-limiting component 7 and the diode 3 of the voltage converter 1 are connected in series with the coil 5. In the inactive state II, the voltage-limiting component 7 is therefore arranged in a first connection line L511, which connects the coil 5 and the voltage converter 1.

Said component is, however, short-circuited in the active state I. For this purpose, the contactor 10 comprises an electrical switch 6. The electrical switch 6 is for example a bipolar transistor, a field-effect transistor or an IGBT. Said switch is conductive in the active state I, and open in the inactive state II. The voltage-limiting component 7 is connected in parallel with the electrical switch 6 for this purpose. As such, one of the electrical contacts of the voltage-limiting component 7 is connected to the emitter terminal E of the electrical switch 6, and the other electrical contact of the voltage-limiting component 7 is connected to the collector terminal C of the electrical switch 6. The base terminal B of the electrical switch 6 is arranged above an electrical resistor 4 on a second connection line L512, which connects the coil 5 and the voltage converter 1. In the active state I, a control current I4 flows through the electrical switch 6, and therefore said switch becomes conductive and short-circuits the voltage-limiting component 7. By contrast, in the inactive state II, there is no control current I4, and therefore the electrical switch 6 opens.

This arrangement makes it possible for the contactor 10 to be deactivated by deactivating the voltage converter 1. This is because the output voltage UA of the voltage converter 1 supplies the switching voltage U6 for making the electrical switch 6 conductive.

The voltage converter 1 is deactivated by means of the control unit 2. The control unit 2 also activates the voltage converter 1.

In this case, therefore, simply activating or deactivating the voltage converter 1 is sufficient in order to activate and deactivate the contactor 10. The control unit 2 controls the voltage converter 1 for this purpose by means of a first control signal $I_{s1}$.

In order to control the current intensity of the current I5 flowing through the coil 5, the contactor 10 further comprises a current controller 8. The current controller 8 is, for example, designed as a linear controller or a switching controller. By way of example, a current controller 8 is shown here which is designed as a switching controller and controls the current intensity of the current I5 by means of pulse-width modulation. For this purpose, said controller comprises an electrical control switch 80, the control unit 2 controlling the opening and closing of the control switch 80 by means of a second control signal $I_{S2}$. As a result, the current I5 flowing through the coil 5 is larger during an operation process immediately following activation of the contactor 10 than during a holding process in the case of a coil 5 which has already been operated.

In the embodiment shown, the voltage converter 1 is a DC voltage power supply unit. In this case, however, the contactor 10 also comprises for example a rectifier 9, by means of which said contactor is connected to an AC voltage $U_N$, for example of a supply voltage network.

Figure 2:
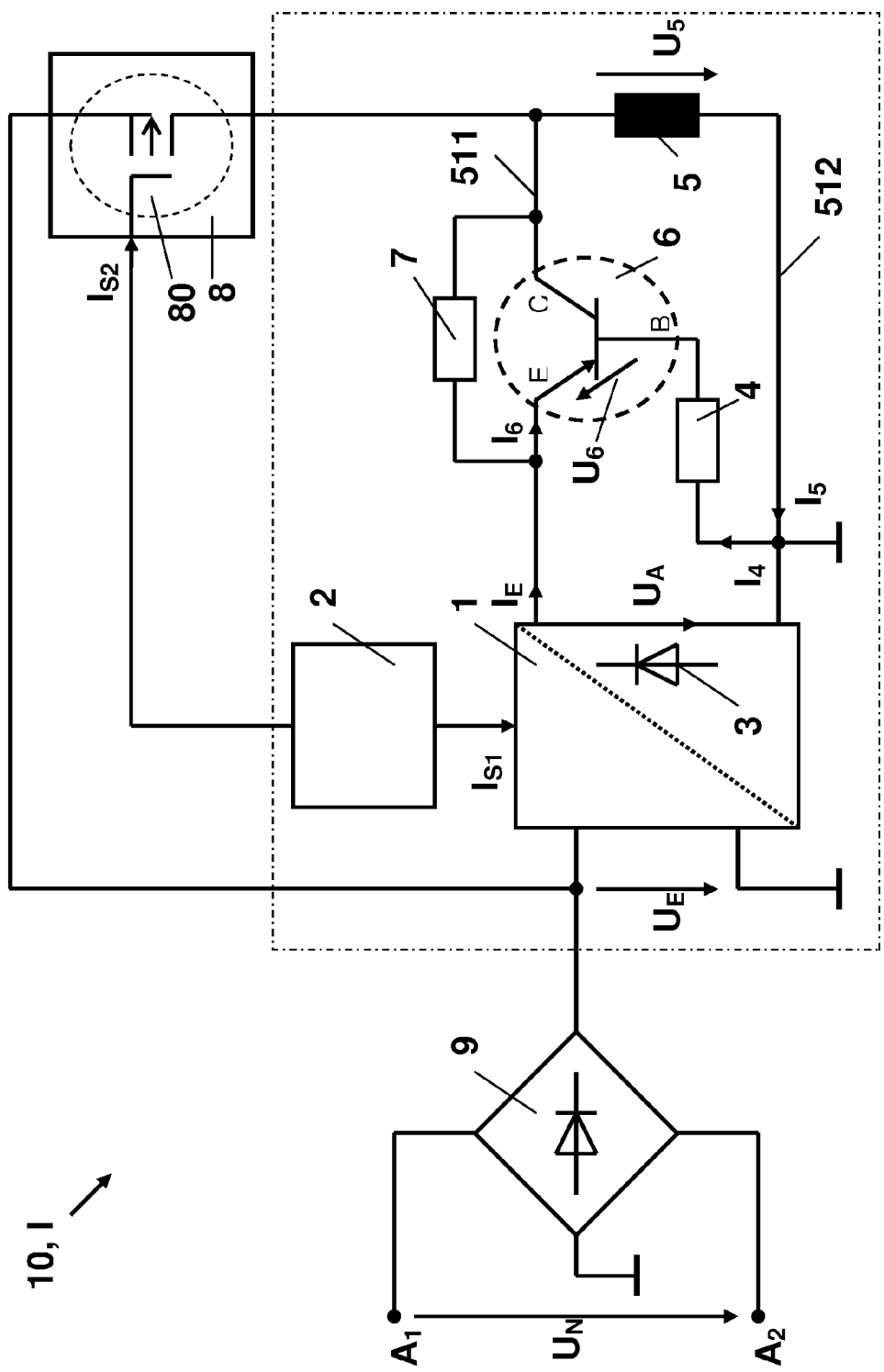
FIG. 2a a second embodiment of a contactor according to the invention in the active state.
FIG. 2b a second embodiment of a contactor according to the invention in the inactive state.
Figure 2:
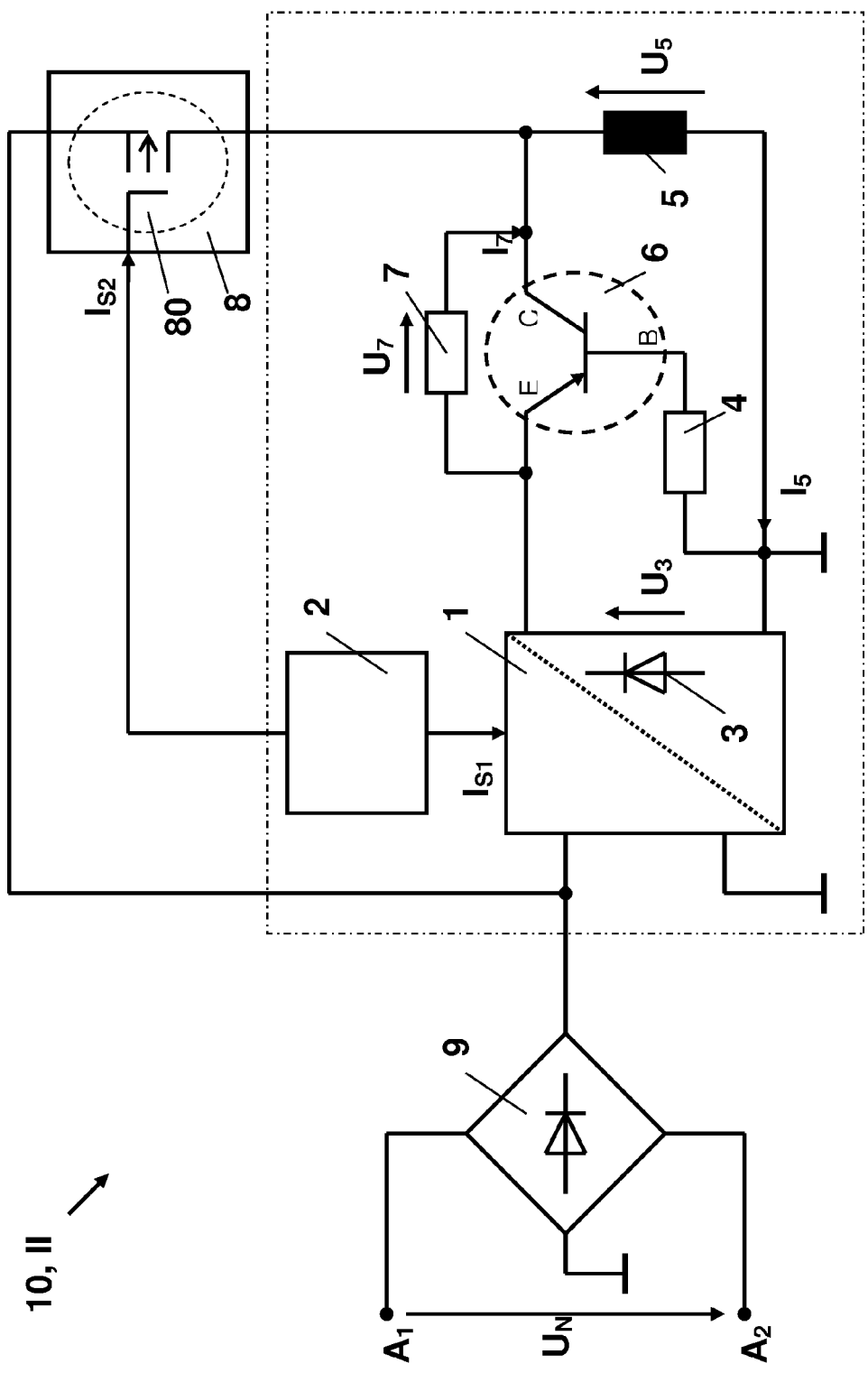

FIGS. 1 and 2 differ in terms of the electrical switch 6, which is an NPN transistor in FIG. 1, and a PNP transistor in FIG. 2. FIGS. 1 (a) and 2 (a) both show the active state I. In the active state I, the voltage-limiting component 7 is short-circuited by the conductive electrical switch 6, and therefore the output voltage UA of the voltage converter 1 drops across the coil 5 and said coil is operated.

By contrast, FIGS. 1 (b) and 2 (b) show the inactive state II. In the inactive state, the electrical switch 6 is open, and therefore the coil 5 is released and discharges across the voltage-limiting component 7.

In FIGS. 1 (a), (b) and 2 (a), (b), the electrical control switch 80 is in each case a pMOS transistor. The electrical control switch 80 may, however, also be replaced by a PNP transistor.

FIG. 1 (c), however, shows the contactor 10 from FIGS. 1 (a) and (b) comprising an electrical control switch 80 designed as an nMOS transistor in the inactive state. The nMOS transistor can also be replaced by an NPN transistor in this case.

Similarly, the contactor 10 in FIG. 2 can also be produced such that it comprises a control switch 80 designed as an NPN or nMOS transistor, or as a PNP or pMOS transistor.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE SIGNS

1 Voltage converter, DC/DC converter
2 Microcontroller, microprocessor
3 Freewheeling diode, Zener diode
4 Resistor
5 Coil
50 Contactor contact
51 Switching apparatus
6 First transistor
7 Voltage limiter
8 Current controller, linear controller, switching controller
80 Control switch, control transistor
9 Rectifier
10 Contactor
A1, A2 Electrical terminal contacts
S Source
E Emitter
D Drain
UN Supply network voltage
UE Input voltage of the voltage converter
UA Output voltage of the voltage converter
UE Diode voltage
U5 Coil voltage
U6 Switching voltage of the electrical switch
U7 Limiter voltage
IE Input current
I4 Control current
I5 Coil current
I6 Transistor current
I7 Limiter current
IS1 Control current for the voltage converter
IS2 Control current for the linear control or PWM control I Active state
II Inactive state
L511 First connection line
L512 Second connection line

The invention claimed is:

1. A contactor, comprising:
   a coil through which current flows in an active state of the contactor;
   a control unit configured to control the contactor; and
   a voltage converter,
   wherein, in the active state, the voltage converter is configured to convert an input voltage into a coil voltage which drops across the coil,
   wherein the voltage converter is electrically switchable back into the active state from an inactive state using the control unit,
   wherein the contactor is configured to be switched into the active state from the inactive state by activating the voltage converter, and
   wherein the contactor is switched out of the active state into the inactive state by deactivating the voltage converter.

2. The contactor of claim 1, further comprising:
   a contactor contact configured to be operated and switched on by the coil in the active state of the contactor, and to be switched off in the inactive state of the contactor.

3. The contactor of claim 1, wherein the control unit includes a microcontroller or a microprocessor.

4. The contactor of claim 1, further comprising:
   a current controller configured to control a current intensity of a coil current.

5. The contactor of claim 4, wherein the control unit is configured to control the current controller.

6. The contactor of claim 1, further comprising:
   a voltage-limiting component, configured to be short-circuited in the active state,
   wherein a load voltage drops across the voltage-limiting component for disconnection of the contactor following deactivation thereof from the active state into the inactive state.

7. The contactor of claim 6, wherein the voltage-limiting component comprises an electrical resistor, a varistor, or a diode.

8. The contactor of claim 6, wherein the voltage converter includes a diode used as a freewheeling diode for the coil after the contactor switches back into the inactive state from the active state.

9. The contactor of claim 8, wherein the voltage-limiting component and the diode are arranged in series with the coil after the contactor switches back into the inactive state from the active state.

10. The contactor of claim 6, wherein the voltage converter comprises a DC voltage converter.

11. The contactor of claim 6, further comprising:
    an electrical switch configured to short-circuit the voltage-limiting component, which switch is conductive in the active state, and open in the inactive state.

12. The contactor of claim 11, wherein the electrical switch comprises a transistor.

13. A method of disconnection of a contactor, the method comprising, sequentially:
    electrically deactivating, by a control unit, a voltage converter from an active state into an inactive state so as to interrupt a coil current flowing through a coil and open an electrical switch,
    wherein a voltage-limiting component and a diode are arranged in series with the coil in the inactive state, a coil voltage dropping across the coil being discharged across the voltage-limiting component and across the diode of the voltage converter.

14. The method of claim 13, further comprising, following deactivation of the voltage converter:
    deactivating a contactor contact of the contactor in less than 50 ms.

* * * * *